United States Patent [19]

Smitka

[11] 4,252,350
[45] Feb. 24, 1981

[54] JOINT ASSEMBLY FOR AIR DUCT

[76] Inventor: Günter Smitka, Friedenstr. 9, 5868 Lethmathe, Fed. Rep. of Germany

[21] Appl. No.: 958,689

[22] Filed: Nov. 8, 1978

[30] Foreign Application Priority Data

Nov. 9, 1977 [DE] Fed. Rep. of Germany ....... 2750110
Aug. 23, 1978 [DE] Fed. Rep. of Germany ....... 2836761

[51] Int. Cl.³ .............................................. F16L 23/00
[52] U.S. Cl. ..................................... 285/363; 285/424
[58] Field of Search ................ 285/364, 424, 363, 405

[56] References Cited

U.S. PATENT DOCUMENTS 3,199,901 8/1965 Jeppsson ............................. 285/364
3,630,549 12/1971 Grimm .............................. 285/424 X

FOREIGN PATENT DOCUMENTS 2313425 9/1974 Fed. Rep. of Germany ........... 285/424
2434160 1/1976 Fed. Rep. of Germany ........... 285/424

Primary Examiner—Thomas F. Callaghan

Attorney, Agent, or Firm—Karl F. Ross

[57] ABSTRACT

A joint assembly for the end of a prismatic duct comprises a frame including a plurality of elongate L-section profiles each formed unitarily of sheet metal with a pair of legs the first of which parallels a corresponding duct sidewall and forms one of two jaws which define a slot receiving that sidewall, the second leg being hollow and forming an open-ended transverse channel accommodating angularly or curvilinearly profiled sheet-metal arms of associated corner pieces. The channel is bounded by two generally parallel walls either or each of which has an extension forming part of the other jaw of the slot. The free edge of at least the second leg forms a bent-over two-ply stiffening rib which could be engaged by a connecting clip. Barb-like formations on either or both slot-forming jaws and on the sidewall bracketed thereby engage each other to lock the frame onto the duct. The corner pieces have holes enabling the frame to be bolted or riveted to a similar frame of an adjoining duct, or to some other support.

14 Claims, 9 Drawing Figures

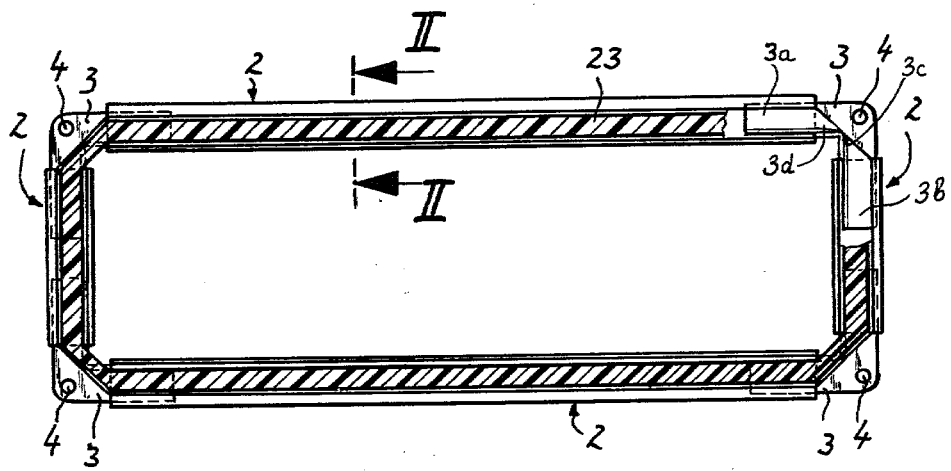
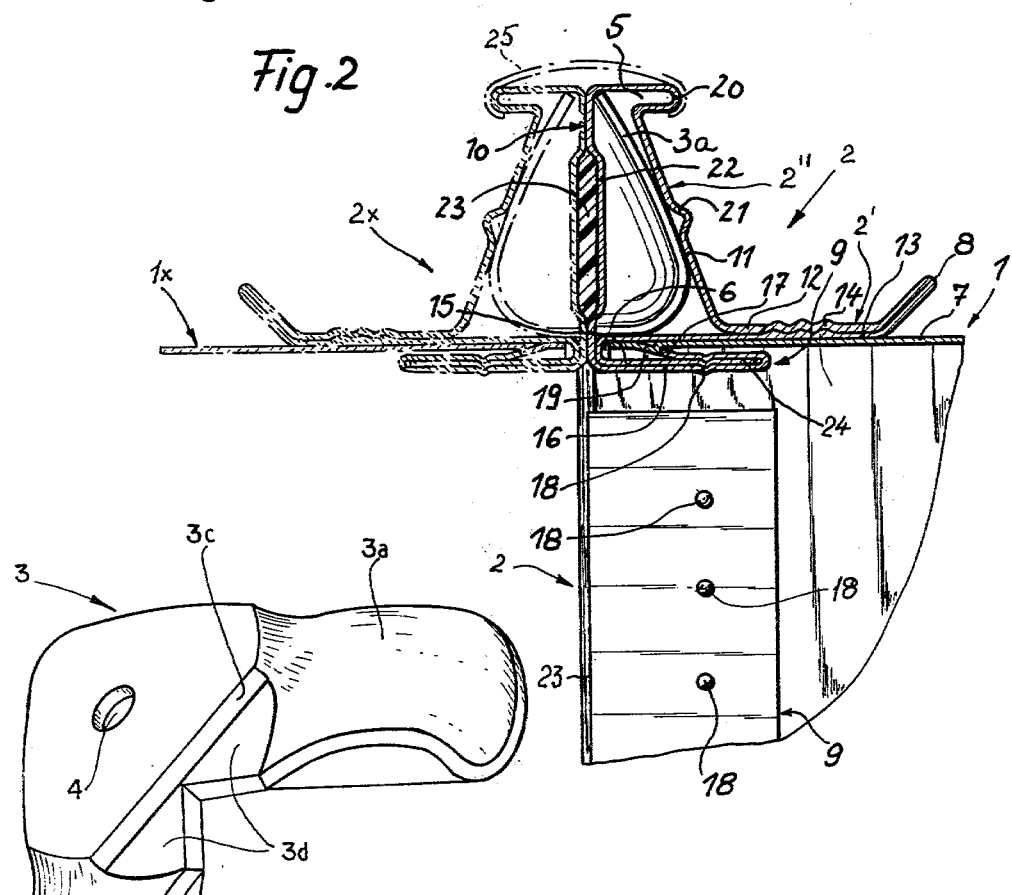
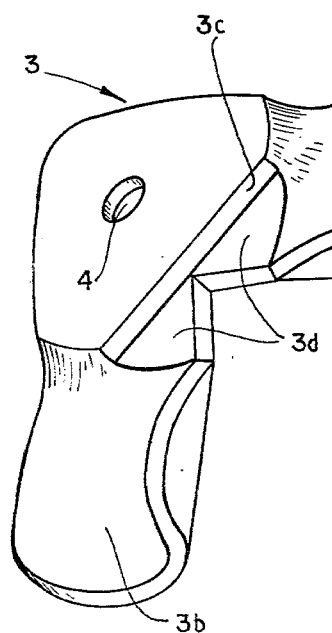

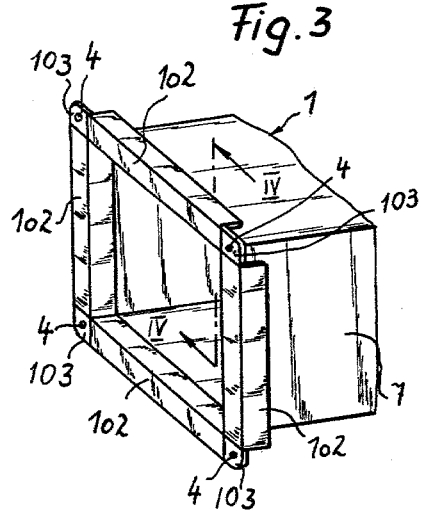
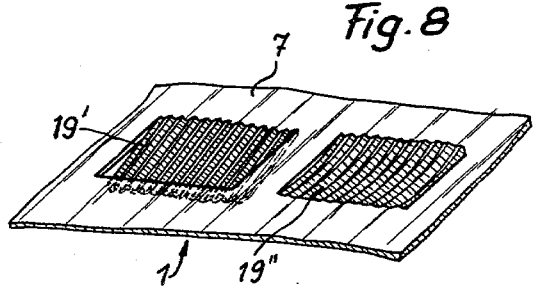
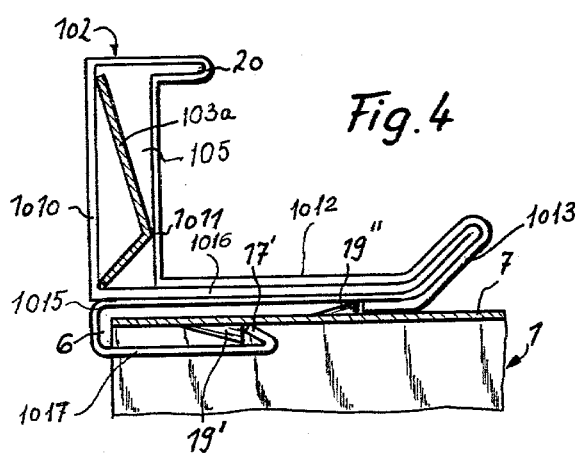
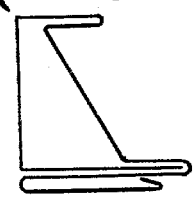
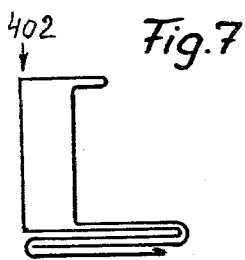
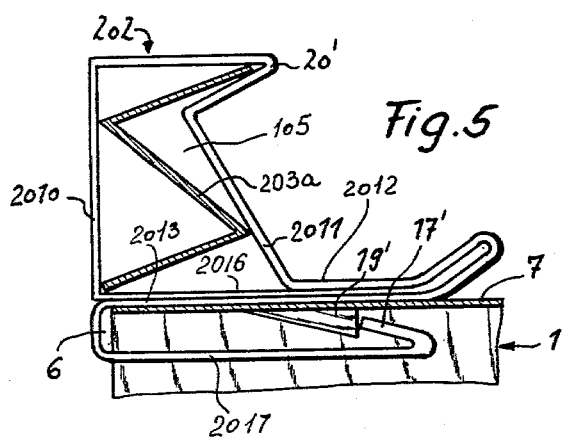

JOINT ASSEMBLY FOR AIR DUCT

FIELD OF THE INVENTION

My present invention relates to a joint assembly for connecting the end of a prismatic duct, e.g. one of rectangular cross-section used for air-conditioning or heating purposes, to another such duct or to a fitting.

BACKGROUND OF THE INVENTION

Such an assembly is known, for example, from German published specification No. 2,138,966 or U.S. Pat. No. 3,199,901. The ducts here considered are normally made of light-gauge galvanized sheet steel having little inherent structural strength so that the provision of a reinforcing joint assembly is essential for a good connection to an adjoining duct or other support.

Such a joint assembly normally is composed of a plurality of profiles, one for each sidewall of the duct, and as many corner pieces each interlinking two adjacent profiles to form a closed polygonal structure or frame. Normally the profiles at least are made of rolled inexpensive sheet metal. The difficulty with such systems is that the production of the profiles by rolling as well as the conditions of use often generate stresses resulting in an excessive deformation of the profiles so that leekproofness of the joint is no longer assured.

OBJECTS OF THE INVENTION

The general object of my present invention is to provide an improved assembly of this type which resists external as well as internal stresses and will maintain a fluidtight joint even when connected to another such assembly by simple fasteners such as bolts or rivets, without the use of guide rails as described in the aforementioned U.S. Pat. No. 3,199,901.

A related object is the provision of such a joint assembly which can be produced at relatively low cost.

SUMMARY OF THE INVENTION

I attain these objects, according to the instant invention, by providing a preferably four-sided frame whose profiles are each of L-section with first leg extending parallel and a hollow second leg extending generally perpendicularly to the duct; an extension of the first leg forms a jaw defining therewith a rearwardly open slot adapted to receive a respective sidewall of the duct while the second leg has spaced-apart front and back walls defining an open-ended transverse channel. Each of the corner pieces has a pair of arms extending at an angle to each other and engaging in the transverse channels of respective adjoining profiles. Each profile is unitarily formed from sheet metal bent into plies, the first leg comprising several such plies one of which is bent back at a bight constituting the closed front end of the duct-receiving slot to form a rearwardly extending flap which is part of the aforementioned jaw. The slot-closing bight is substantially coplanar with the front wall of the second leg.

Advantageously, each leg of the L-profile has its free edge formed into a two-ply bent-over lip or flange for increased rigidity.

The stiffness imparted by this construction allows even a relatively large duct to be secured with a fluidtight seal to a similarly reinforced duct, or to some other support, merely by screws passing through holes in the corner pieces. As the profiles are extremely rigid, they will not bow out of their centers and allow leakage.

According to a further feature of my invention, the sidewalls of the duct and at least one of the flanks of each slot accommodating same are provided with co-acting barb-type formations preventing the disengagement of the duct from the frame. Then, the frame need only be pushed onto the end of the duct for positive interlocking therewith. The locking formations of the frame may be constituted by bent-over edge portions of the longitudinal profile legs and/or their slot-forming extensions.

BRIEF DESCRIPTION OF THE DRAWING

The above and other features of my invention will now be described in detail with reference to the accompanying drawing in which:

FIG. 1 is an end view of a four-sided duct equipped with an assembly according to this invention;

FIG. 2 is a fragmentary sectional view taken on the line II—II of FIG. 1 and drawn to a larger scale;

FIG. 3 is a reduced-scale perspective view of an assembly similar to that shown in FIGS. 1 and 2;

FIG. 4 is an enlarged cross-sectional view taken on the line IV—IV of FIG. 3;

FIG. 5 is a view similar to FIG. 4, showing a modified frame structure embodying my invention;

FIGS. 6 and 7 are smaller-scale schematic end views illustrating other frame structures in accordance with this invention;

FIG. 8 is a perspective view of a detail of FIGS. 3 and 4, drawn to a larger scale; and FIG. 9 is an enlarged perspective view of a corner piece shown in FIGS. 1 and 2.

SPECIFIC DESCRIPTION

As shown in FIGS. 1 and 2, a rectangular-section duct 1 has four planar sidewalls 7 each of which is fitted to a respective profile 2 of a rectangular frame whose profiles are interconnected by corner pieces 3. Each corner piece 3 has a throughgoing bore 4 for securing the frame to a like assembly or some other support. My copending applications Ser. Nos. 870,720 filed Jan. 19 1978, now U.S. Pat. No. 4,123,094, and 920,164, filed June 29 1973, show generally similar corner pieces whose arms, however, are flat rather than curved (FIG. 2) or angularly bent as described hereinafter with reference to FIGS. 4 and 5.

As shown in FIG. 2, each of the frame profiles 5 is formed unitarily of a single piece of galvanized sheet steel and is generally of L-section with two mutually orthogonal legs 2', 2". Leg 2" is generally perpendicular to the duct axis and is hollow, forming an open-ended transverse channel 5 of generally trapezoidal cross-section, whereas leg 2' is parallel to the respective duct wall 7 (and therefore to the duct axis) and has an extension 9 forming with it a pair of jaws to define a slot 6 in which the wall 7 is received.

The axially extending leg 2' has a free edge bent into a slanting lip 8, formed of two superposed layers or plies 12, 13 of sheet metal, diverging from the sidewall 7 to facilitate its insertion into the slot 6. Mating indentations or bumps 14 formed in plies 12 and 13 lock them together againt relative shifting. An extension of layer 13 is bent into a bight 15 and ends in a flap 24 enfolded by two layers 16 and 17 to form the jaw 9. These latter layers are extensions of a sheet portion 10 constituting the front wall of channel 5; plies 12 and 13, on the other hand, are continuations of a sheet portion 11 constituting the rear wall of that channel. The three stacked sheet portions 16, 17, 24 are matingly indented at 18 to prevent relative shifting.

The re-entrant flap 17, pointing forwardly toward bight 15, resiliently diverges from the rearwardly pointing flap 24 and backstops, in barb-like fashion, a set of projections 19 (only one shown) on the associated wall 7 to prevent the detachment of the inserted duct end from the frame 2, 3. The rear wall 11 of the perpendicular leg 2" forms two rearwardly extending ribs 20 and 21; rib 20 may serve as a ledge engageable by a clip or guide rail 25 to secure the profile 2 to a mirror-symmetrical profile 2x on an adjoining duct 1x, as indicated in FIG. 2 by phantom lines, yet such additional connection will not be necessary in many instances.

The front wall 10 is formed with a groove or depression 22 projecting into channel 5 and receiving an elastomeric sealing strip 23. The corner pieces 3, as particularly illustrated in FIG. 1 for the one shown at upper right, have arms 3a, 3b which are forwardly concave (see FIG. 2) so as to come to rest against channel walls 10, 11 while resiliently straddling the groove 22. Between the adjoining profiles 2, each corner piece 3 has a flat body with a diagonal ledge 3c bounding a recessed land 3d which is substantially coplanar with the groove bottom formed by wall 10. Thus, when two confronting frames attached to aligned ducts 1, 1x are clamped together by rivets or bolts traversing the bores 4 of their corner pieces, strip 23 is compressed at each corner between two lands 3d as well as within the grooves 22 of the profiles to provide an all-around airtight seal.

The profiles 2 are rolled from sheet steel which is relatively inexpensive and easy to deform, yet the described multilayer structure of the duct-gripping jaws 2', 9 maintains the shape of the frame even against substantial mechanical and thermal stresses. The frame 2, 3 could also be used to secure the duct 1 to a building wall having an aperture in line therewith, possibly with interposition of a grating or screen.

FIGS. 3 and 4 show another arrangement wherein profiles 102 have parallel front and back walls 1010 and 1011 which define a channel 105 of generally rectangular rather than trapezoidal cross-section. Here the front wall 1010 is flat and flush with the front faces of corner pieces 103, though grooves and recesses accommodating an external sealing strip could be provided also in this instance (as well as in the structures of FIGS. 5-7 described below). Wall 1010 has an extension 1016 bent back on itself to form two middle layers of the longitudinal leg of the profile, enfolded by extension 1012, 1013 of wall 1011; the two-ply sheet portion 1016 continues beyond a bight 1015 as a flap 1017 which defines the inner jaw of slot 6 and terminates in a barb-shaped hook 17' coacting with one or more inwardly projecting lugs 19' of duct wall 7. Similar but outwardly projecting lugs 19" are backstopped by the inturned flap 1013. These lugs may be resilient tongues partly cut out from the duct wall as illustrated in FIG. 8 for formation 19', 19".

Corner pieces 103 have resilient arms which, as shown at 103a in FIG. 4, are bent at an obtuse angle to engage the channel walls 1010, 1011. As in the case of corner pieces 3, these arms bear upon the front wall 1011 along two widely separated lines; the cross-sectional outline of each arm, therefore, is in three-point contact with the boundary of channel 105.

In FIG. 5 I have shown a frame profile 202 similar to profile 102 of FIGS. 3 and 4 but with a rear wall 2011 diverging from front wall 2010 of channel 205 to accommodate an arm 203a or a corner piece which is of Z-section, a branch thereof extending into a modified reinforcing rib 20'. Extensions 2012, 2013 of wall 2011 enfold a longitudinally disposed middle layer 2016 extending from wall 2010 and further form the inner jaw 2017 of slot 6 with hook 17' engaging a lug 19'. The lug 19" of FIG. 4 is here omitted.

FIG. 6 shows a frame profile 302 substantially identical with profile 202 but without the diverging lip of the longitudinal leg.

FIG. 7 shows a frame profile 402 which differs from profile 102 mainly by having a straightened longitudinal leg. Profiles 302, 402 may coact with corner pieces whose sheet-metal arms are angularly or curvilinearly profiled as depicted in the preceding Figures.

Naturally, the frame profiles shown in FIGS. 3-7 may also have their superposed sheet portions provided with interfitting indentations as illustrated at 14 and 18 in FIG. 2.

FIG. 9 shows the corner piece 3 of FIGS. 1 and 2 in greater detail. The strip-engaging ledge 3c defining the recessed land 3d, of course, will not be needed if the channel wall 10 lacks the groove 22; the front face of member 3 could then be a flat square as seen in FIG. 3 for the corner piece 103.

I claim:

1. A joint assembly for a prismatic duct having flat angularly adjoining sidewalls parallel to an axis, comprising:

a polygonal frame composed of a plurality of unitary sheet-metal profiles, one for each sidewall, and as many corner pieces interlinking said profiles, each of said profiles having a generally L-shaped cross-section with a first leg with several sheet-metal plies substantially paralleling said axis and a hollow second leg having an open-ended transverse channel bounded by a front wall perpendicular to said axis and a rear wall generally parallel to said front wall;

each of said corner pieces having a pair of angularly adjoining arms inserted into the open ends of the transverse channels of adjoining profiles, said arms having profiled cross-sections in contact with said front and rear walls for holding same separated;

each of said profiles being integrally formed with a jaw forming an extension of at least one of said walls and paralleling said first leg on the side remote from said second leg for defining with said first leg a rearwardly open slot receiving the end of a respective sidewall of said duct, said jaw including a rearwardly pointing flap formed by one of said plies of said first leg bent about a front end of said slot at a bight substantially coplanar with said front wall for embracing said sidewall upon insertion thereof into said slot.

2. A joint assembly as defined in claim 1 wherein said flap terminates in a barb formation coacting with an inward projection of said sidewall to lock said duct to said frame.

3. A joint assembly as defined in claim 1 wherein said one of said plies is a continuation of said rear wall, said flap being enveloped by a sheet portion extending from said front wall.

4. A joint assembly as defined in claim 3 wherein said flap and the enveloping sheet portion are provided with mating indentation preventing relative shifting thereof.

5. A joint assembly as defined in claim 1 wherein said plies include a middle layer extending rearwardly from said front wall and two enveloping layers extending from said rear wall.

6. A joint assembly as defined in claim 5 wherein one of said enveloping layers is foreshortened with reference to said middle layer and forms a backstop for an outward projection of said sidewall to lock said duct to said frame.

7. A joint assembly as defined in claim 1 wherein said first leg projects rearwardly beyond said jaw.

8. A joint assembly as defined in claim 7 wherein said first leg terminates beyond said jaw in a slanting lip diverging from said axis to facillitate the insertion of said sidewall.

9. A joint assembly as defined in claim 1 wherein said front wall has a depression projecting into said channel to accommodate an external sealing strip, said depression being straddled by the cross-sections of said arms.

10. A joint assembly as defined in claim 1 wherein said arms have a curvilinear cross-section bearing upon said front wall at two points.

11. A joint assembly as defined in claim 1 wherein said arms have an angularly bent cross-section bearing upon said front wall at two points.

12. A joint assembly as defined in claim 1 wherein said rear wall forms at lest one rearwardly pointing stiffening rib.

13. A joint assembly as defined in claim 1 wherein said corner pieces are provided with bores for the insertion of fastening means to secure said frame to a support.

14. In combination, a pair of aligned ducts provided with respective joint assemblies as defined in claim 13, the frames of said joint assemblies being interconnected by fastening means passing through the bores of their corner pieces.

* * * * *